Feb. 17, 1970  J. G. R. TYNDALL ET AL  3,495,725
STORAGE SYSTEMS AND FORKLIFT TRUCKS FOR USE THEREWITH
Filed Sept. 7, 1967
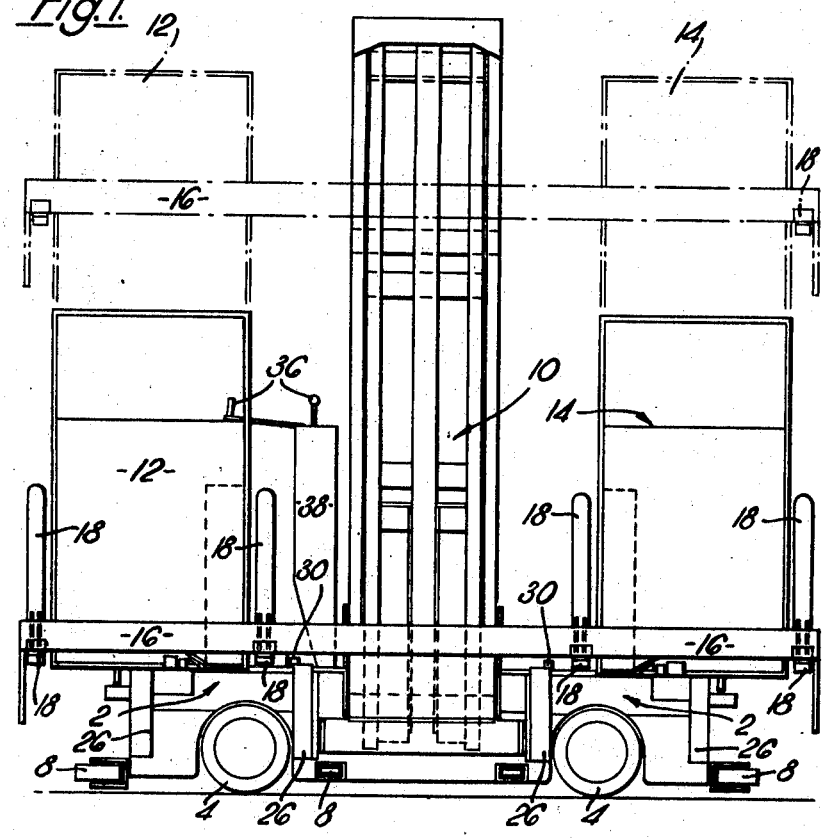
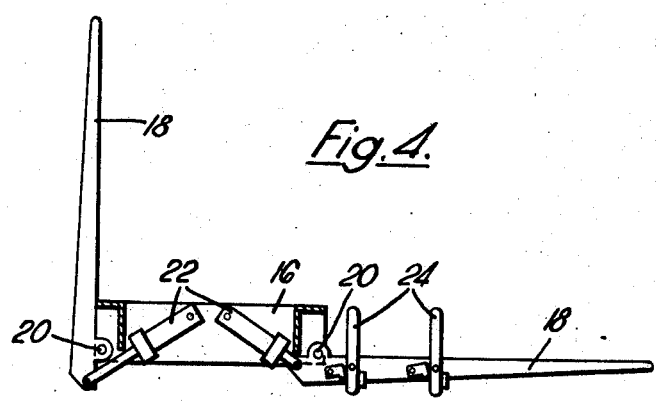

Feb. 17, 1970  J. G. R. TYNDALL ET AL  3,495,725
STORAGE SYSTEMS AND FORKLIFT TRUCKS FOR USE THEREWITH
Filed Sept. 7, 1967  4 Sheets-Sheet 2
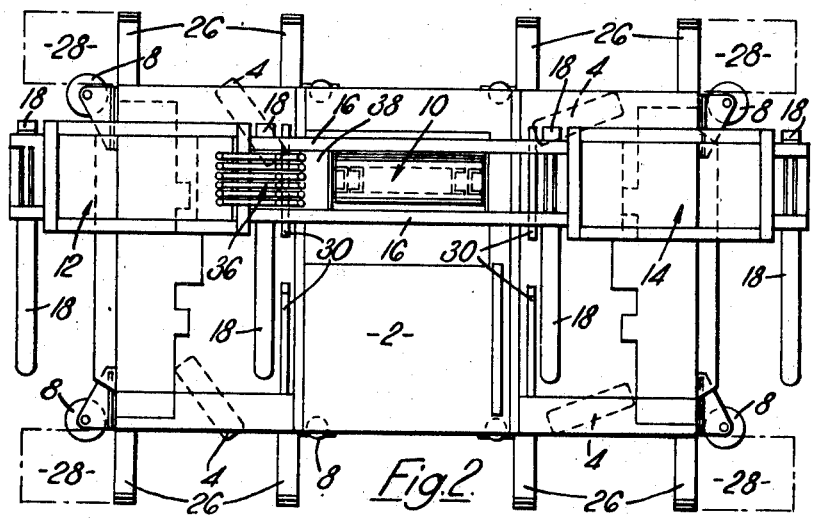
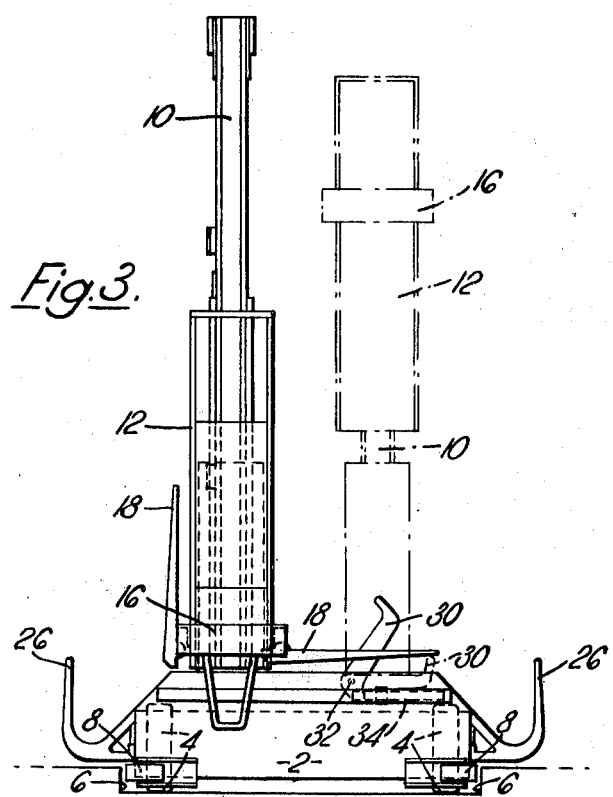

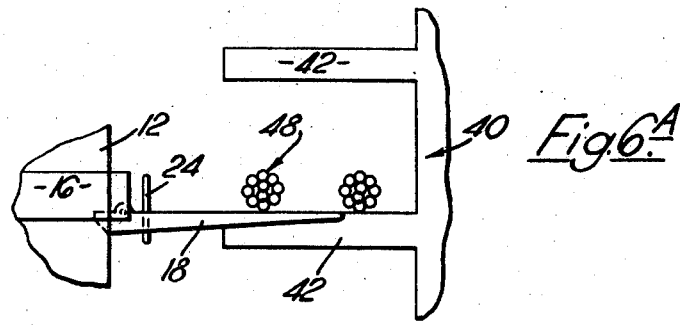
Fig.6.A
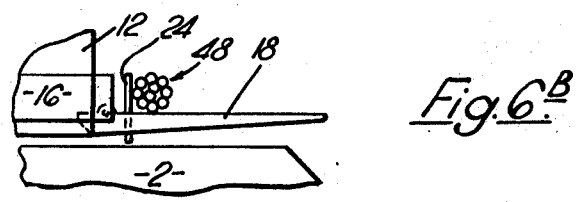
Fig.6.B
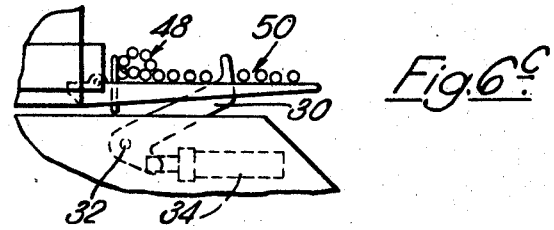
Fig.6.C
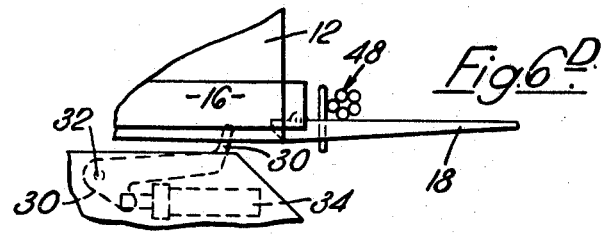
Fig.6.D
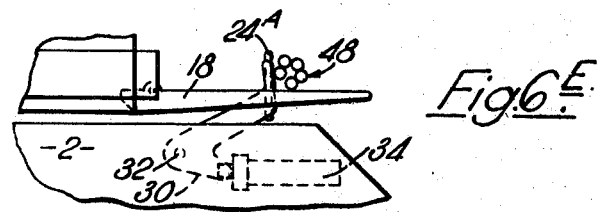
Fig.6.E United States Patent Office 3,495,725
Patented Feb. 17, 1970

3,495,725
STORAGE SYSTEMS AND FORKLIFT TRUCKS
FOR USE THEREWITH
John Gordon Roper Tyndall, Wycombe, Julius Kingsley Campbell Lawrence, Crowle, and Ronald Stephen Daya, Surrey, England, assignors to Miles Druce & Company Limited, High Wycombe, England, a British company
Filed Sept. 7, 1967, Ser. No. 666,159
Claims priority, application Great Britain, Sept. 19, 1966, 41,787/66
Int. Cl. B66f 9/12; B65g 61/00
U.S. Cl. 214—75                                    5 Claims

ABSTRACT OF THE DISCLOSURE

The forklift truck for bars or the like comprises a mast having a framework movable up and down thereon and having forks extending laterally out from the framework; an operator's platform carried by the framework on the same side of the mast as the forks so that an operator may handle stock carried on the forks, means being associated with the forks movable to a position extending up from the forks to prevent the bars from rolling from the ends of the forks.

DESCRIPTION OF INVENTION

This invention relates to the storage of steel stock in a warehouse and to means for withdrawing selected items or quantities of the stock from the racks in which the stock is placed.

Heretofore steel stock i.e. bars or rods which are secured in bundles of for example 5 tons in weight have had to be removed in bundles from racks or the like in a store and each bundle brought separately to a despatch bay where the bundles are broken, the required item extracted and the remainder of the bundle-resecured. The depleted bundles are then returned one by one to their correct storage rack. This operation is inefficient due to the length of time taken to convey bundles to and from the despatch bay.

In a stock storage system in accordance with the invention the bundles are removed from racks by the use of a forklift truck or the like and the bundles are broken open, the desired stock removed and the bundles re-tied whilst the bundles are on the truck and whilst the truck is stationary at the desired rack. The bundle can then be returned to its rack without travel by the truck. Thus the truck can move from rack to rack selecting or picking the desired items from each rack, the items being carried by the truck until all the desired items have been collected or the carrying means on the truck is full. The truck then takes it load to a despatch bay. It will be appreciated that the system avoids the necessity for frequent journeys to and from each rack for which stock is to be selected.

A folklift truck for operating the system in accordance with the invention has one or preferably two cabins or operating platforms which are arranged to rise with the forks. At least two and preferably four, forks preferably extend out from one or both sides of the truck and are spaced so as to be able to carry bar material of from say 8 to 25 ft., long. The cabin(s) are preferably so arranged that the occupants can lean out and handle bars or rods on the forks. The truck will normally include stock carrying means such as side panniers to hold and transport items of stock selected from various bundles.

The forks may be designed to tilt in a vertical plane so that bundles of rods or bars can be held on the forks against a stop or the like by gravity which facilitate handling and so that the forks can be folded up. When the stock bundles are fairly light it is desirable to be able to break the bundles, isolate the selected rods or bars and re-tie the bundles all at rack level. To assist in the operation a removable stop is preferably provided on each fork so that the selected items can be placed on the inner side of the stop and the remainder of the bundle be held on the outer side.

When the stock bundles are heavy it is more convenient to break the bundles and remove the selected item at the level of the truck platform and a claw is preferably provided on the platform which can pivot up between the forks to provide means to isolate the selected items from the remainder of the bundle. With the use of such a claw the selected items are positioned on the outer portion of the forks and then the forks are withdrawn so that the claw causes the selected items to fall over the outer ends of the forks into the carrying pannier.

The invention will now be further described by way of example with reference to the accompanying drawings, in which:

FIGURE 1 is a side elevation of a forklift truck in accordance with the invention;

FIGURE 2 is a plan view of the truck;

FIGURE 3 is an end elevation;

FIGURE 4 is a detail of the connection of the forks to the truck;

FIGURES 5A–5F are diagrams illustrating the sequence of operations for selection of specific items of a bundle of stock at rack level, and FIGURES 6A–6E are diagrams corresponding to those of FIGURE 5 but illustrating the sequence of operations for selection of items at the platform of the truck.

Figure 5A:
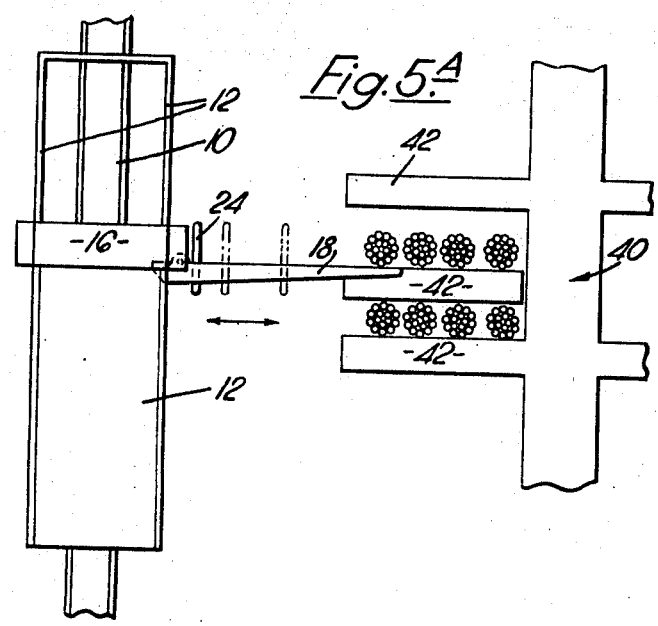
Figure 5B:
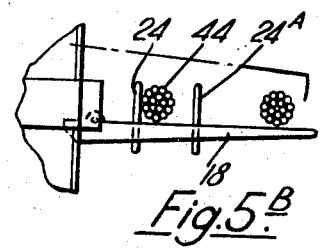

The forklift truck illustrated in FIGURES 1 to 4 comprises a platform 2 mounted on wheels 4 and guided in channels 6 (see FIGURE 3) in the floor by horizontal wheels 8, and supporting a central mast generally indicated at 10. Two operator's cabins 12, 14 are suported one at each side of the mast and two pairs of forks 18 project outwardly from a framework 16 at each side of the truck (one pair being shown folded up in the drawings).

When the framework 16 is elevated on the mast 10 the cabins 12, 14 move upwardly with the forks from the position shown in full lines in FIGURE 1 to the position shown in dot and dash lines. The forks can also be elevated to some extent relatively to the cabins.

The mast and its assembly, i.e., the framework 16, cabins 12 and 14 and forks 18 can be traversed across the width of the truck from the position shown in full lines in FIGURES 2 and 3 to that shown in dot and dash lines in FIGURE 3 so that the forks can operate on each side of the truck, those in operation having been pivotted about pivots 20 by operation of a hydraulic cylinder 22, or the like, from the out of use position as shown on the lefthand side of FIGURE 4 to the horizontal or operative position as shown on the right-hand side of FIGURE 4.

Each fork is provided with two or three stops 24 which are pivoted to the forks and which can be moved from their operative position shown on the right-hand side of FIGURE 4 to a position in which they are folded down within the thickness of the forks by a hydraulic cylinder or the like (not shown). If desired the stops can be removable and when desired merely inserted in position on the forks.

Four pannier hooks 26 are provided at each side of the truck to hold selected bars or rods so that these can be transported from the racks to the despatch bay and vice versa. The distance between the paniers and between adjacent forks is made such that rod or bar material of any desired length e.g. from about 8 ft. to 25 ft., long can be carried. If desired extension panniers indicated in dot and dash lines at 28 in FIGURE 2, can be fitted.

Claw members 30 are located at each side of the truck, each being pivoted at 32 to the framework of the truck below the platform. Each claw can be raised or lowered by means of a hydraulic cylinder 34 between the operative position as shown in full lines in FIGURE 3 and the inoperative position shown in the dotted lines. As will be explained hereafter the claw is used to help support selected items of stock at platform level.

The operation of the various parts of the truck can be controlled by an operator whilst in his cab through levers 36 which acts in a control box 38 which rises with the cab.

The warehouse in which the truck will be used has a number of rows of stanchions generally indicated at 40 in FIGURES 5a and 6a each having projecting outwardly from each side at regular intervals, a number of horizontal rack members 42 which form compartments in which stock of specific size or grade can be stored. Gangways are left between adjacent rows of compartments to enable the forklift truck to operate, the forks at one side of the truck being designed to load and unload stock bundles from the compartments of one row of racks and those at the other side of the truck being intended to be used for the rack compartments of the adjacent row.

If the bundle from which selected items of stock are to be taken is fairly light the items can be removed at rack level, i.e. with the forks in the elevated position. The sequence of operations is illustrated in FIGURES 5A–E.

The truck is first driven to the position along a gangway at which the relevant stock compartment is positioned and the forks on that side of the truck are positioned horizontally as shown in FIGURE 5A. The forks are then elevated to the necessary height and fed into the rack and a bundle generally indicated at 44 is caused to roll on to the forks with the aid, if necessary, of a hook or mechanical aid controlled by the operators who can lean out from their cabins which have been elevated with the forks. The forks are then withdrawn. The stock bundle is caused to run up against the inner stop 24 which has been elevated (see FIGURE 5B) and the relatively outer stop 24A is then elevated to maintain the bundle.

Figure 5E:
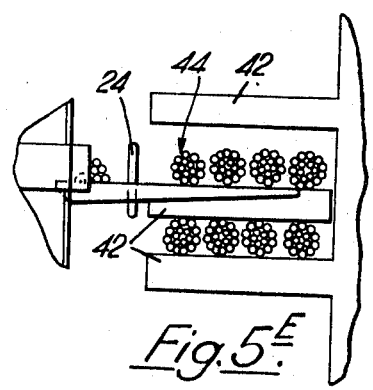
Figure 5C:
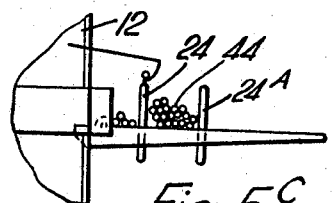
Figure 5D:
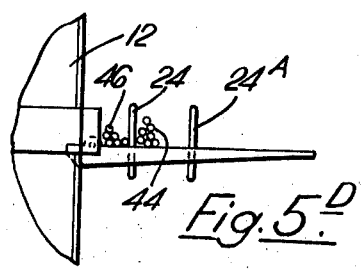
Figure 5E:
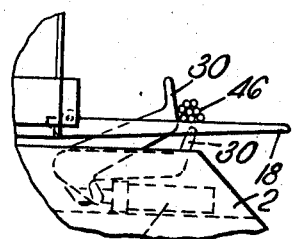

The operators can then break the bundle and select the bars which are required for one particular order those selected being caused to ride over the inner stop by means of hooks (or the like) as shown in FIGURE 5C. The selected bars, i.e. those between the cabin and the inner stop 24 are then tied into a bundle and the remaining bars of the stock bundle are re-tied. The operation of tying can be aided by the use of hooks or the like and by tilting the forks (FIGURE 5D). The outer stop 24A is lowered and the forks are re-introduced into the rack compartment and the remains of the stock bundle caused to be moved from the forks back into the compartment (FIGURE 5E).

The forks are then withdrawn and lowered to platform level where the inner stop 24 is lowered (see FIGURE 5F) and the claw 30 is elevated between the selected items and the cabin. The forks are then withdrawn, the bundle being pushed off the ends of the forks by the stationary claw 30. The bundle 46 of selected stock then falls into the panniers hooks 26 where it is maintained during movement of the truck to other parts of the racking where further stock items are picked and transferred to the panniers. When the panniers are full the truck is driven to the despatch bay.

If the stock which is required is too heavy for handling at an elevated position the sequence of operation illustrated in FIGURES 6A to E may be used. The forks are again elevated and inserted into the compartment. The bundle 48 of stock is moved on the forks and the bundle moved to the position where it abuts the inner stop 24 (FIGURE 6B). The forks are then lowered to platform level.

When the forks are at platform level the claw 30 is elevated so that the bundle is positioned between the inner stop 24 and the claw. The bundle is then broken and the selected bars 50 are lifted over the claw to the outer ends of the forks by means of hooks or any desirable mechanical aid. This can be done by operators on the floor or opeeators leaning out from the cabins.

The remains of the main stock bundle 48 is then re-tied and the selected items can also be tied if required. The mast and forks are then moved to the left as shown in FIGURE 6C across the width of the truck so that the selected items 50 are caused to fall off the end of the forks into the pannier hooks by the stationary claw 30.

The claw is then moved downwardly to its inoperative position as shown in FIGURE 6D and the forks and cabins are traversed to the right to the position shown in FIGURE 6D. The claw is then again elevated and the inner stop lowered. The forks are again withdrawn to the left so that the bundle 48 is moved along the length of the forks to the required outer position ready for transfer to a rack see FIGURE 6E. The outer stop 24A is then raised to hold the bundle during upward travel and the forks and cabins again elevated and the forks traversed further to the right to replace the bundle in its appropriate compartment.

It will be appreciated that bundles can be picked from racks on either side of the truck, the appropriate pairs of forks being used those on the side not being used being elevated to the inoperative vertical position as shown at the left hand side of FIGURE 4.

The truck can continue to be used until the panniers on both sides are full whereupon the load is taken to the despatch bay.

A system in accordance with the invention which avoids the use of separate journeys between each rack compartment and the despatch bay, clearly effects a saving in time and helps toward greater efficiency of stock selection and despatch.

We claim:

1. A forklift truck for bars or the like, comprising a mast; a framework movable up and down the mast; forks extending laterally out from the framework; operator's platforms carried by the framework disposed on the same side of the mast as the forks so that an operator may handle stock carried on the forks; means associated with the forks movable to a position extending upwardly from the forks to prevent the bars from rolling from the ends of the forks; the forks, platforms and the mast of the truck being movable across the width of the truck so that the forks may extend outwardly on either side of the truck; stock holding means extending outwardly from each side of the truck; claws provided on the platform of the truck, the claws being pivotable between the forks to provide means to isolate selected items of bars on the forks; and the forks being movable vertically relatively to the operator's platforms.

2. A forklift truck as claimed in claim 1 having at least two forks extending out from both sides.

3. A forklift truck as claimed in claim 1 in which the forks are pivoted so as to be tiltable in a vertical plane.

4. A forklift truck as claimed in claim 1 in which control means are provided on the framework to operate the forklift truck through levers which rise with the framework so as to be accessible to the operator at any platform height.

5. A forklift truck as claimed in claim 1 having two platforms, one at each side of the mast, two forks being positioned on each side of each platform, the framework extending across the mast with the forks extending out at right angles to the framework.

References Cited

UNITED STATES PATENTS

| 2,598,865 | 6/1952 | Turner | 214—730 |
| 2,633,260 | 3/1953 | Sutherland | 214—750 |
| 3,092,268 | 6/1963 | Powers | 214—670 XR |

(Other references on following page)

UNITED STATES PATENTS

| | | |
|---|---|---|
| 3,175,722 | 3/1965 | Paulssen. |
| 3,202,242 | 8/1965 | Dolphin _____ 214—730 XR |
| 3,212,654 | 10/1965 | Dolphin _____ 214—730 XR |
| 3,258,145 | 6/1966 | Costello _____ 214—620 |
| 3,263,777 | 8/1966 | Robichon. |

FOREIGN PATENTS

| | | |
|---|---|---|
| 1,168,975 | 9/1958 | France. |
| 658,570 | 10/1951 | Great Britain. |
| 890,877 | 3/1962 | Great Britain. |
| 927,867 | 6/1963 | Great Britain. |
| 988,565 | 4/1965 | Great Britain. |

GERALD M. FORLENZA, Primary Examiner

R. B. JOHNSON, Assistant Examiner

U.S. Cl. X.R.

214—16.4, 660, 750